United States Patent [19]

Doherty et al.

[11] Patent Number: 5,999,227
[45] Date of Patent: Dec. 7, 1999

[54] SPECIAL FEATURES FOR DIGITAL TELEVISION

[75] Inventors: Donald B. Doherty, Irving; Robert J. Gove, Plano; John R. Reder, Mesquite, all of Tex.

[73] Assignee: Texas Instruments Incorporated, Dallas, Tex.

[21] Appl. No.: 08/876,112

[22] Filed: Jun. 13, 1997

Related U.S. Application Data

[63] Continuation of application No. 08/709,146, Sep. 6, 1996, which is a continuation of application No. 08/344,256, Nov. 23, 1994.

[51] Int. Cl.⁶ .................................................. H04N 5/445
[52] U.S. Cl. ........................... 348/564; 348/578; 348/554
[58] Field of Search ..................... 348/553, 584, 348/564, 205, 565, 589, 600, 563, 706, 578, 554; 370/112

[56] References Cited

U.S. PATENT DOCUMENTS

| | | | |
|---|---|---|---|
| 4,743,958 | 5/1988 | Bannister | 348/705 |
| 5,134,484 | 7/1992 | Willson | 348/564 |
| 5,157,495 | 10/1992 | Small | 348/705 |
| 5,331,417 | 7/1994 | Soohoo | 348/584 |
| 5,347,318 | 9/1994 | Kobayashi et al. | 348/564 |
| 5,351,129 | 9/1994 | Lai | 348/584 |
| 5,365,276 | 11/1994 | Imai et al. | 348/564 |
| 5,367,334 | 11/1994 | Nishino | 348/705 |
| 5,420,534 | 5/1995 | Elabd | 370/112 X |
| 5,420,641 | 5/1995 | Tsuchida | 348/565 |
| 5,444,711 | 8/1995 | Mizuguchi et al. | 370/112 |
| 5,453,796 | 9/1995 | Duffield et al. | 348/584 |

*Primary Examiner*—Victor R. Kostak
*Attorney, Agent, or Firm*—Charles A. Brill; Frederick J. Telecky, Jr.; Richard L. Donaldson

[57] ABSTRACT

A system for handling special television video features digitally. The system receives incoming broadcast video into a switch (106). The switch allows the viewer to select a main channel and at least one auxiliary channel for viewing as a special feature, if the viewer does not want to view only the main channel for that particular special feature. The main video channel data is processed by a scan converter (216) to convert it from interlaced to progressive scan. A logic device (212) handles the auxiliary channel data to format it into the selected special feature and inputs that data to the scan converter (216) such that the special feature appears in the proper place relative to the main channel image.

9 Claims, 2 Drawing Sheets

SPECIAL FEATURES FOR DIGITAL TELEVISION

This application is a continuation of application Ser. No. 08/709,146 filed on Sep. 6, 1996, which is a continuation of application Ser. No. 08/344,256 filed on Nov. 23, 1994.

BACKGROUND OF THE INVENTION

1. Field of the Invention

This invention relates to digital television systems, more particularly to special features for digital television systems.

2. Background of the Invention

Digital television has several advantages over the current standard analog system. Because the digital data can be packed, more data can be transmitted that allows for a better picture. Additionally, manipulation of the data on a picture element (pixel) level can reduce artifacts and increase the resolution and overall clarity of the picture.

Currently, most televisions that implement digital displays remain restricted by the analog transmission standard. Because of that and because, to some extent, adding special features in analog requires less data manipulation, most of these sets do all of the processing in the analog realm and convert to digital just before display.

While some special feature processing modules process data in the digital realm internally, most have analog input and output (I/O) to support analog broadcast and display standards. These processing modules must then include an analog to digital (A/D) converter for the inputs and a digital to analog (D/A) converter for the outputs. This increases the complexity and cost of the processing circuitry over a circuit with digital I/O. Further, each converter degrades the digital signal. For televisions that implement digital displays and several special feature modules, this series of A/Ds and D/As can noticeably corrupt the television picture.

Special features include picture-in-picture (PIP), which allows other channels to be viewed within the main channel's picture. These usually reside in small windows around the outside of the main channel's picture, or the channel being viewed. Picture-outside-picture typically has the extra channels along the side, top or bottom of the main channel, but instead of encroaching on the main channel's picture, they are boxed next to it. Additional special features are zoom, freeze, TV guide and his/hers. TV guide usually involves some number of channels all displayed simultaneously, with no main channel picture, so the viewer can decide what to watch. His/hers includes two pictures, side by side on the TV.

Most current television systems perform the channel manipulation and set up in analog and then convert the incoming data to digital format for display. This becomes awkward when either the entire television system functions digitally, or the incoming signal is itself digital. Therefore, a need exists for the ability to provide the special features of a television set in the digital realm.

SUMMARY OF THE INVENTION

A digital implementation of a television system with special features is disclosed. The ability to perform these functions digitally allows the system to function entirely in the digital realm after reception of the signal. If the signal received is analog, it is converted once to the digital domain and processed digitally all the way thought the system. Performing these special functions in the digital domain also has the advantage of eliminating conversion to analog then back to digital if the incoming signal is digital. Addition of a switch allows all of these features to be provided with no redundant circuitry and therefore at minimum cost.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
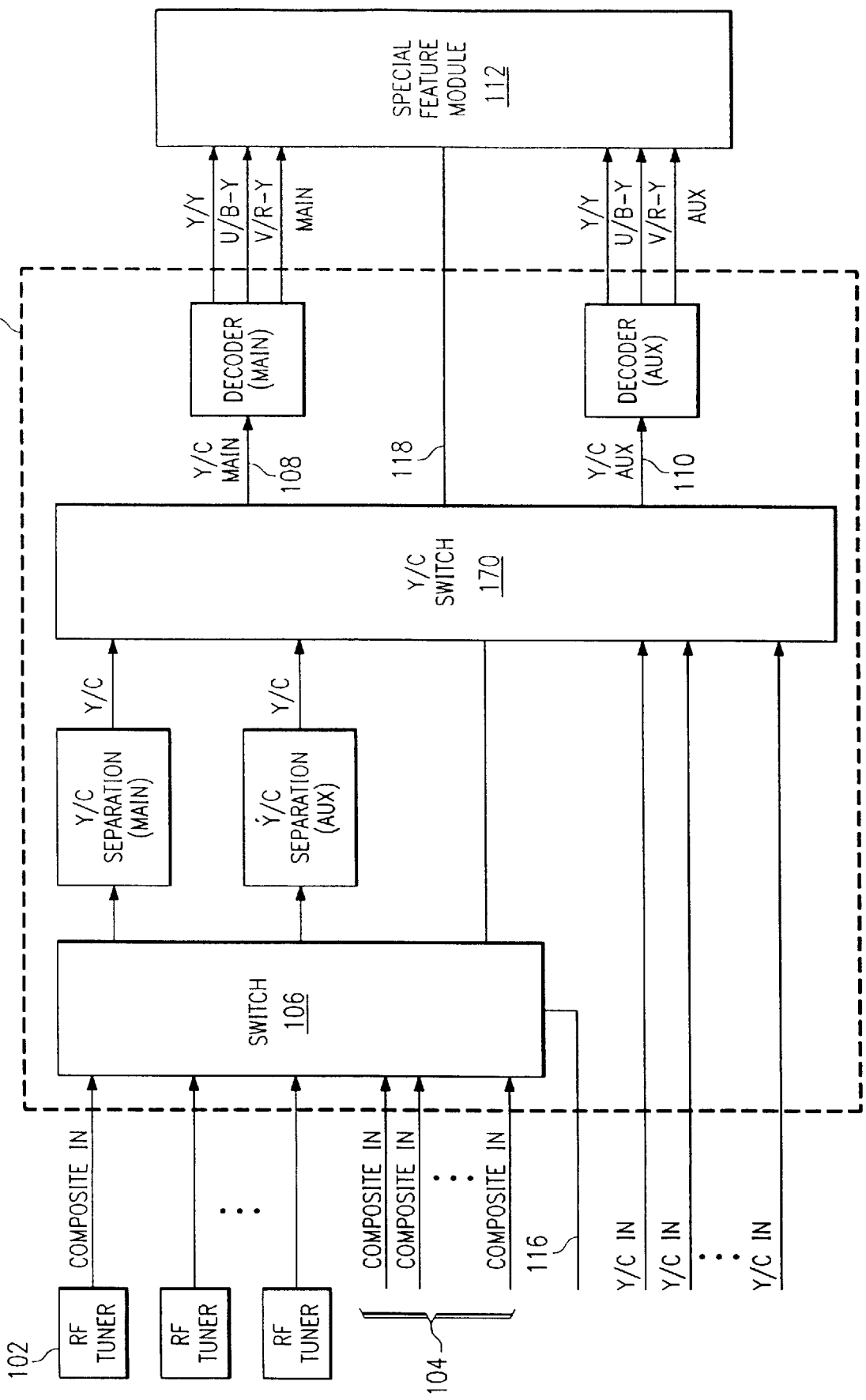
FIG. 1 shows a system level diagram of a digital television system.

FIG. 1 shows a digital display system with a special features module. The incoming video could be in several formats. It could come in through a receiver such as 102 and enter the switch 106 as composite video. Lines 104 represent input in S-Video format, where the chrominance and luminance have been separated into channels. All channels receivable by the television set, either in composite or in S-Video format, will be received at switch 106. The feature select line 116 represents the viewers' input.

For whatever feature the viewer selects, the main channel data will travel to the special features box through the chrominance and luminance switch (Y/C switch) 120 onto path 108 and the auxiliary video on path 110. The auxiliary channel could be handled in ways separate from the way in which the main channel is handled. However, for ease of discussion they are both processed the same way in FIG. 1. Which channels comprise the auxiliary video depends upon the feature select signal 116 which is passed to the special features module 112 along path 118. For example, if the viewer wanted to watch channel 8 and have 2 picture-in-picture (PIP) channels of channels 4 and 6, the main channel data would be channel 8 and the selected, or predetermined, auxiliary channel data would be two channels wide with channels 4 and 6. The number of channels selectable is only limited by the amount of memory in the system. Additionally, all of the elements within box 100 could be on one device.

Special features created by the special features circuitry include PIP, picture out of picture (POP), zoom, freeze, his/hers, and TV guide. The PIP features has a main channel picture of moving video, with a smaller picture of moving video within the borders of the main picture. More than one smaller picture could be displayed. For circuitry conservation, the additional pictures may not be moving video, but "frozen" where one frame of data is displayed without change. POP differs from PIP in that the main channel picture remains uncovered by the smaller pictures.

In his/her format, the two channels are reproduced side by side on the same screen. Zoom enlarges a portion of the picture to fill the entire display area. Freeze pauses the main video picture. Finally, TV guide allows the viewer to simultaneously display several channels of TV in order to select the one which is to be watched.

Figure 2:
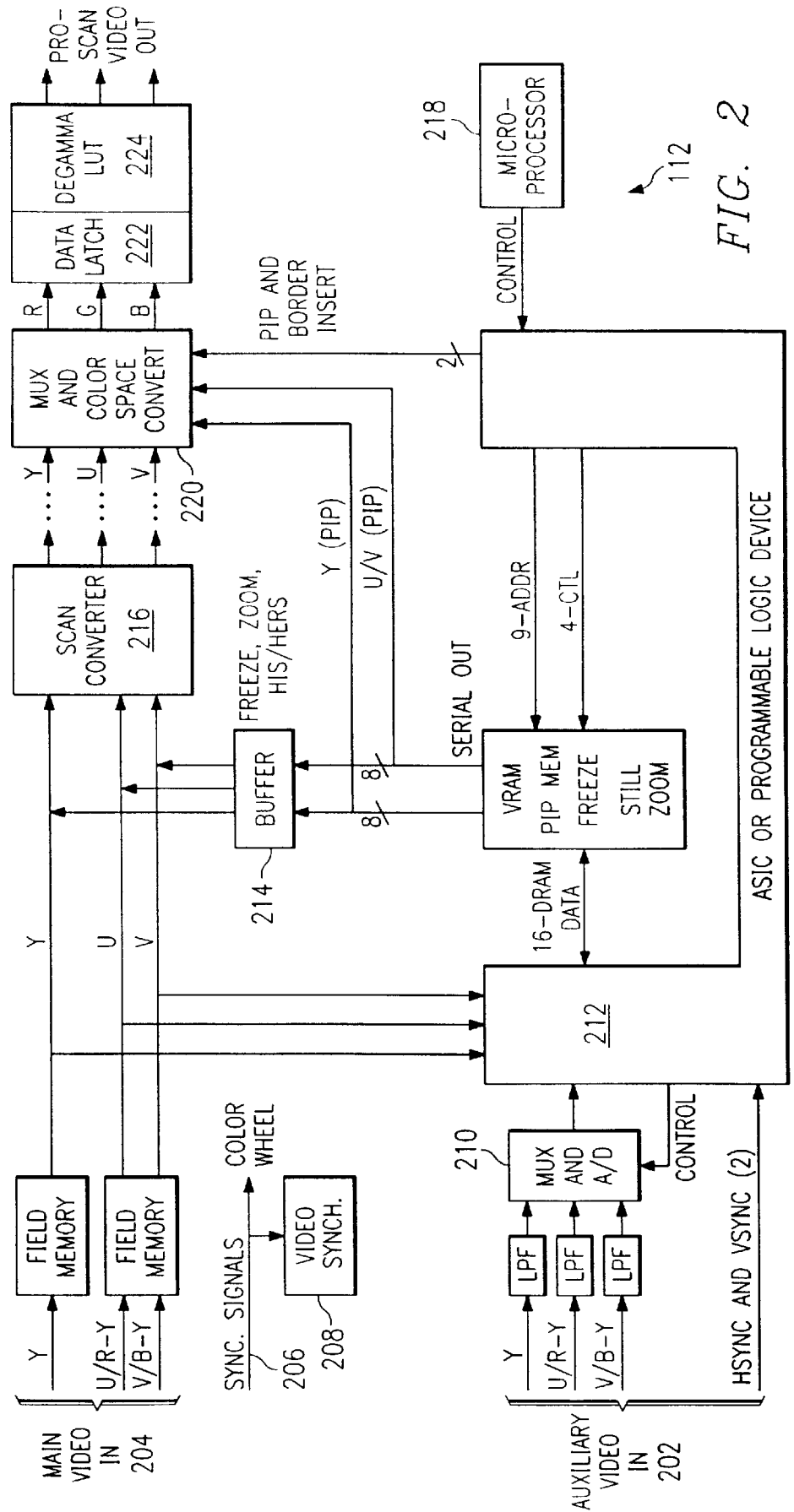
FIG. 2 shows a schematic diagram of the special features processor of a digital television system.

All of these features are enabled in digital format by the special features module 112 in FIG. 2. Starting with the main video lines 204, adjustment must first be made for the interlaced nature of most broadcast video. Broadcast video typically comes in a format that requires two fields to be interlaced together. One field typically contains the odd-numbered lines and the other field contains the even-numbered lines. The fields are put together on a cathode ray tube type display. Some examples of digital type displays are digital micromirror device (DMD) displays, and liquid crystal device (LCD displays). Additionally, an A/D converter, not shown, is necessary for analog digital input.

These types of displays use an array of individually addressable cells that are typically addressed by rows and columns. Because of the nature of this addressing, it is impractical to interlace the fields as in the CRT applications. The entire frame must be recreated on the face of the device before it is transmitted to the screen, referred to in this context as progressive scan. In order to compensate for this interlacing effect, the luminance signal Y is sent to a field memory and the chrominance difference signals U/R-Y and V/B-Y are sent to a field memory. This allows storage of the data needed to convert the signal from interlace to progressive scan. Conversion of the interlaced signal to progressive scan is also discussed in U.S. patent application Ser. No. 08/147,249 "Digital Television System," incorporated herein by reference.

These three signals are also sent to an application specific integrated circuit (ASIC) or programmable logic device 212 that will create the special features. The special feature data must be inserted in the appropriate place in the progressively scanned picture. Eventually, this adjusted data will be returned to the main video data stream just before it enters the scan converter 216, which actually performs the interlace to progressive scan conversion.

Joining the signals from the main video channel are the signals from the auxiliary video channel. The luminance and color difference signals are low-pass filtered to eliminate any high frequency noise and sent to a multiplexer and analog to digital converter (MUX & A/D) 210. If the incoming data is digital television, the use of the A/D is no longer necessary.

The ASIC or programmable logic device 212 also receives a horizontal and vertical synchronization signal from the main channel and the auxiliary channel. It decodes these signals and coordinates the flow of data from each channel accordingly. It also decodes the auxiliary channel synchronization signals to generate the multiplexer select and sample clock of the MUX & A/D 210. The ASIC 212 creates the appropriate feature to the correct scale under control of microprocessor 218. When the feature data is processed it is sent via a 16-bit DRAM bus to a VRAM 226. At the appropriate time, the data then passes to buffer 214, or in the case of PIP/POP data, directly to MUX and color space converter 220. The ASIC 212 generates the necessary VRAM read and write addresses and control signals to implement the desired feature. For certain features, such as PIP/POP, the ASIC 212 also converts the auxiliary channel's interlaced data to progressive scan data for mixing into the main video channel's stream. Other features may utilize the scan converter 216 via the buffer 214.

The color space converter inserts the PIP/POP data into the appropriate part of the picture data and converts the entire frame into red-green-blue (RGB) data. This RGB data is then sent to a data latch 222. Finally, if the signal contains gamma correction, the gamma must be removed via a degamma lookup table (LUT) 224 and the proscan video output is sent to the array.

The resultant image has the appropriate feature, as selected by the viewer, in the overall picture, typically sent to the display device as one data stream. The digital processing of these features will become important if the incoming data stream is digital, rather than the analog standards currently used. Additionally, using a digital means of display such as the DMD and LCD light modulators in conjunction with a digital special features implementation allows for better coordination and image correction by allowing additional processing of the data before it moves to the array to reduce other artifacts not necessarily related to the processing of special features. This includes such elements as motion and edge detection to eliminate other processing artifacts, or to enhance color and contrast.

Thus, although there has been described to this point particular embodiments of a digital display system with special features, it is not intended that such specific references be considered as limitations upon the scope of this invention except in-sofar as set forth in the following claims.

What is claimed is:

1. A video display system, comprising:
   a tuner for receiving broadcast video display signals;
   multiple video input sources converted by said tuner from said broadcast video display signals wherein said video sources are converted to digital format if necessary;
   a switch for selecting at least two sources from said multiple input sources, wherein said sources include at least one source of alternate predetermined channel data and one source of main channel data;
   a special feature module for digitally multiplexing said at least two sources into one stream of video data wherein said module includes a logic device for mixing said at least one alternate predetermined channel data into main channel data as one video data stream and outputting said one video stream containing both alternate channel data and main channel data wherein both said channels are output simultaneously; and
   a display for displaying images represented by said one video data stream, wherein said display displays digital data.

2. The system of claim 1 wherein said multiple input video sources include both analog and digital sources.

3. The system of claim 1 wherein said mutiple input video sources include only digital sources.

4. The system of claim 1 wherein said multiple input video sources include only analog sources, wherein said analog sources are digitized for use in said system.

5. The system of claim 1 wherein said special feature module includes an application specific integrated circuit for processing one of said at least two sources as an auxiliary input source.

6. The system of claim 1 wherein said special feature module includes a scan converter for mixing said at least two sources into one digital output stream for display.

7. A digital display system with special features, comprising:
   a switch for receiving incoming video signals and a feature selection signal wherein said feature selection signal determines which feature a viewer desires to have integrated into images projected onto said display;
   a main video channel wherein said main channel contains data used in displaying images represented by data from a predetermined incoming video channel;
   an auxiliary video channel wherein said auxiliary channel contains data used in displaying images represented by data from at least one alternate predetermined incoming video channel;

a scan converter for converting said incoming video from interlaced to progressive scan video images;

a logic device for mixing said at least one alternate predetermined channel data into main channel data;

a master synchronization circuit for coordinating timing of said data such that said data is synchronous with said progressive scan video image; and a display which displays digital data.

8. The system of claim 7 wherein said logic device mixes and converts said at least one alternate predetermined channel data into progressive scan video images.

9. The system of claim 7 wherein said logic device is operable to provide data from said at least one alternate predetermined channel data to said scan converter.

* * * * *